United States Patent
Horn et al.

(10) Patent No.: US 9,706,423 B2
(45) Date of Patent: Jul. 11, 2017

(54) SYSTEM AND METHOD OF OFFLOADING TRAFFIC TO A WIRELESS LOCAL AREA NETWORK

(71) Applicant: QUALCOMM Incorporated, San Diego, CA (US)

(72) Inventors: Gavin Bernard Horn, La Jolla, CA (US); Arnaud Meylan, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 13/830,289

(22) Filed: Mar. 14, 2013

(65) Prior Publication Data

US 2013/0242783 A1 Sep. 19, 2013

Related U.S. Application Data

(60) Provisional application No. 61/612,127, filed on Mar. 16, 2012, provisional application No. 61/682,629, filed on Aug. 13, 2012.

(51) Int. Cl.
| | |
|---|---|
| *H04W 24/10* | (2009.01) |
| *H04W 88/10* | (2009.01) |
| *H04W 28/08* | (2009.01) |
| *H04W 36/00* | (2009.01) |
| *H04W 88/06* | (2009.01) |
| *H04W 84/12* | (2009.01) |

(52) U.S. Cl.
CPC .......... *H04W 24/10* (2013.01); *H04W 28/08* (2013.01); *H04W 36/0083* (2013.01); *H04W 88/10* (2013.01); *H04W 84/12* (2013.01); *H04W 88/06* (2013.01)

(58) Field of Classification Search
CPC ....................................... H04W 24/10
USPC ....................................... 370/252
See application file for complete search history.

(56) References Cited

U.S. PATENT DOCUMENTS

| | | |
|---|---|---|
| 7,515,909 B2 | 4/2009 | Jain et al. |
| 7,590,708 B2 | 9/2009 | Hsu |

(Continued)

FOREIGN PATENT DOCUMENTS

| | | |
|---|---|---|
| CN | 1954626 A | 4/2007 |
| EP | 2563088 A1 | 2/2013 |

(Continued)

OTHER PUBLICATIONS

LTE for UMTS: Evolution to LTE-Advanced, Second Edition, Mar. 4, 2011, Antti Toskala and Harri Holma, Chapter 6, p. 153.*

(Continued)

*Primary Examiner* — Charles C Jiang
*Assistant Examiner* — Thad Defauw
(74) *Attorney, Agent, or Firm* — Anthony R. Morris

(57) ABSTRACT

Methods and apparatus for offloading traffic from a cellular network to a wireless local area network (WLAN) are described. One example method generally includes receiving, from a serving base station, a request to measure one or more WLAN access points (APs), determining one or more metrics for the WLAN APs, comparing the metrics for the WLAN APs to a threshold, and reporting metrics for at least a first AP of the WLAN APs if the metrics for the first AP exceed the threshold.

84 Claims, 9 Drawing Sheets

(56) References Cited

U.S. PATENT DOCUMENTS

| | | | |
|---|---|---|---|
| 7,720,098 B1 | 5/2010 | Allen et al. |
| 8,019,296 B1 | 9/2011 | Durig |
| 8,036,702 B2 | 10/2011 | Etemad |
| 8,095,129 B2 | 1/2012 | Adams et al. |
| 8,175,047 B2 | 5/2012 | Seok et al. |
| 8,194,603 B2 | 6/2012 | Nimbalker et al. |
| 8,265,038 B2 | 9/2012 | Kezys et al. |
| 8,320,325 B2 | 11/2012 | Xue et al. |
| 8,442,024 B2 | 5/2013 | Montemurro et al. |
| 8,498,666 B2 | 7/2013 | Sebire et al. |
| 8,514,779 B2 | 8/2013 | Ozturk et al. |
| 8,560,009 B2 | 10/2013 | Etemad |
| 8,605,674 B2 | 12/2013 | Park et al. |
| 8,670,432 B2 | 3/2014 | Luo |
| 8,687,545 B2 | 4/2014 | Damnjanovic et al. |
| 8,717,920 B2 | 5/2014 | Larsson et al. |
| 8,761,047 B2 | 6/2014 | Kim et al. |
| 8,817,623 B2 | 8/2014 | Gupta et al. |
| 8,817,644 B2 | 8/2014 | Etemad |
| 8,848,513 B2 | 9/2014 | Das et al. |
| 8,954,106 B2 | 2/2015 | Kim et al. |
| 9,008,067 B2 | 4/2015 | Yi et al. |
| 9,019,848 B2 | 4/2015 | Chun et al. |
| 9,042,320 B2 | 5/2015 | Kim et al. |
| 9,125,012 B2 | 9/2015 | Pelletier et al. |
| 2005/0153692 A1 | 7/2005 | Hwang et al. |
| 2006/0092963 A1 | 5/2006 | Bakre et al. |
| 2007/0140163 A1 | 6/2007 | Meier et al. |
| 2007/0230401 A1 | 10/2007 | Rayzman et al. |
| 2008/0049694 A1* | 2/2008 | Kinoshita | H04W 88/06 370/338 |
| 2008/0316970 A1 | 12/2008 | Choi |
| 2009/0042601 A1* | 2/2009 | Wang | H04W 36/0088 455/553.1 |
| 2009/0129354 A1* | 5/2009 | Gupta | H04W 8/26 370/338 |
| 2009/0296683 A1 | 12/2009 | Raju et al. |
| 2010/0067433 A1 | 3/2010 | Cheng et al. |
| 2010/0103914 A1 | 4/2010 | Tsao |
| 2010/0150082 A1 | 6/2010 | Shin et al. |
| 2011/0044218 A1 | 2/2011 | Kaur et al. |
| 2011/0188376 A1 | 8/2011 | Stupar et al. |
| 2011/0205946 A1 | 8/2011 | Avital et al. |
| 2011/0222523 A1 | 9/2011 | Fu et al. |
| 2011/0267977 A1* | 11/2011 | Doppler | H04W 48/16 370/254 |
| 2011/0305220 A1 | 12/2011 | Lindoff et al. |
| 2012/0028655 A1 | 2/2012 | Mueck et al. |
| 2012/0218963 A1 | 8/2012 | Kim et al. |
| 2012/0218975 A1 | 8/2012 | Aramoto et al. |
| 2012/0230191 A1 | 9/2012 | Fang |
| 2012/0238287 A1 | 9/2012 | Scherzer |
| 2012/0252460 A1 | 10/2012 | Koskinen et al. |
| 2012/0257598 A1 | 10/2012 | Karampatsis et al. |
| 2012/0263145 A1 | 10/2012 | Marinier et al. |
| 2013/0051264 A1 | 2/2013 | Wang et al. |
| 2013/0064190 A1 | 3/2013 | Hariharan et al. |
| 2013/0064191 A1 | 3/2013 | Jeong et al. |
| 2013/0083661 A1 | 4/2013 | Gupta et al. |
| 2013/0095831 A1* | 4/2013 | Lee et al. | 455/436 |
| 2013/0121325 A1* | 5/2013 | McCann | H04W 48/12 370/338 |
| 2013/0142113 A1 | 6/2013 | Fong et al. |
| 2013/0242897 A1 | 9/2013 | Meylan et al. |
| 2013/0242965 A1 | 9/2013 | Horn et al. |
| 2014/0016588 A1 | 1/2014 | Garcia et al. |
| 2014/0043979 A1 | 2/2014 | Etemad et al. |
| 2014/0050086 A1* | 2/2014 | Himayat | H04N 21/2365 370/230 |
| 2014/0112282 A1 | 4/2014 | Wijting et al. |
| 2014/0161026 A1* | 6/2014 | Stojanovski | H04L 45/22 370/328 |
| 2014/0241265 A1 | 8/2014 | Pragada et al. |
| 2014/0335878 A1 | 11/2014 | Uzeda Garcia et al. |
| 2014/0369198 A1 | 12/2014 | Rinne et al. |
| 2014/0369322 A1 | 12/2014 | Fwu et al. |

FOREIGN PATENT DOCUMENTS

| | | |
|---|---|---|
| JP | 2008541670 A | 11/2008 |
| JP | 2013530640 A | 7/2013 |
| TW | 201210371 A | 3/2012 |
| WO | WO-2004077752 A1 | 9/2004 |
| WO | WO-2006116191 A1 | 11/2006 |
| WO | WO-2006124950 A2 | 11/2006 |
| WO | 2009021009 A1 | 2/2009 |
| WO | WO-2011028954 A1 | 3/2011 |
| WO | WO-2011055773 A1 | 5/2011 |
| WO | 2011088406 A1 | 7/2011 |
| WO | WO-2011087223 A2 | 7/2011 |
| WO | WO-2011110108 A1 | 9/2011 |
| WO | WO-2011149533 A1 | 12/2011 |
| WO | 2012121757 A1 | 9/2012 |
| WO | 2012148482 A1 | 11/2012 |
| WO | 2012149954 A1 | 11/2012 |
| WO | WO-2012168535 A1 | 12/2012 |

OTHER PUBLICATIONS

"3rd Generation Partnership Project; Technical Specification Group Services and System Aspects; IP flow mobility and seamless Wireless Local Area Network (WLAN) offload; Stage 2 (Release 10)", 3GPP Standard; 3GPP TS 23.261, 3rd Generation Partnership Project (3GPP), Mobile Competence Centre; 650, Route Des Lucioles; F-06921 Sophia-Antipolis Cedex; France, vol. SA WG2, No. V10.2.0, Mar. 8, 2012 (Mar. 8, 2012), pp. 1-22, XP050555341, [retrieved on Mar. 8, 2012] paragraphs [0004], [0005].

International Search Report and Written Opinion—PCT/US2013/032021—ISA/EPO—Jun. 28, 2013.

Doppler K et al., "Concurrent Bandwidth Aggregation over Wireless Networks" Computing, Networking and Communications (ICNC), 2012 International Conference on, IEEE, Jan. 20, 2012 (Jan. 30, 2012), pp. 604-610, XP032130748, DOI: 10.1109/ICCNC.2012.6167494, ISBN: 978-1-4673-0008-7.

Taiwan Search Report—TW102109514—TIPO—Jan. 13, 2015.
Taiwan Search Report—TW102109514—TIPO—Jan. 6, 2016.
Ericsson, et al., "Spectrum Migration from HSPA to LTE", 3GPP TSG-RAN WG1#64 R1-111089, 3GPP, Feb. 2011, 4 Pages.
ZTE: "Consideration on the Aggregation of LTE and HSPA", 3GPP TSG-RAN WG1#64 R1-111173, 3GPP, Feb. 2011, 4 Pages.
ZTE: "Key Issues to be Considered for HSPA+LTE Aggregation", 3GPP TSG-RAN WG2#75 R2-113904, 3GPP, Aug. 2011.

* cited by examiner

SYSTEM AND METHOD OF OFFLOADING TRAFFIC TO A WIRELESS LOCAL AREA NETWORK

CLAIM OF PRIORITY UNDER 35 U.S.C. §119

The present application for patent claims benefit of U.S. Provisional Patent Application Ser. Nos. 61/612,127, filed Mar. 16, 2012, and 61/682,629, filed Aug. 13, 2012, both of which are assigned to the assignee hereof and hereby expressly incorporated by reference herein in their entirety.

TECHNICAL FIELD

Certain aspects of the present disclosure generally relate to wireless communications and, more particularly, to techniques for offloading traffic from a cellular network to a wireless local area network (WLAN).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

SUMMARY

In an aspect of the disclosure, a method for wireless communications by a user equipment (UE) is provided. The method generally includes receiving, from a serving base station, a request to measure one or more wireless local area network (WLAN) access points (APs), determining one or more metrics for the WLAN APs based on the request, comparing the metrics for the WLAN APs to a threshold, and reporting at least a first AP of the WLAN APs if the metrics for the first AP exceed the threshold.

In an aspect of the disclosure, a method for wireless communications by a base station is provided. The method generally includes transmitting, to a user equipment (UE), a request to measure one or more wireless local area network (WLAN) access points (APs), and receiving a report for at least a first AP of the WLAN APs if measurements for the first AP exceed a threshold.

In an aspect of the disclosure, a method for wireless communications by a user equipment (UE) is provided. The method generally includes determining if a serving base station supports wireless local area network (WLAN) and radio access network (RAN) interworking, and based upon the determination, determining whether to access the serving base station before associating or exchanging transmissions with a WLAN access point (AP).

In an aspect of the disclosure, a method for wireless communications by a wireless local area network (WLAN) access point (AP) is provided. The method generally includes receiving an indication of timing of advertisements, and synchronizing beacons associated with the WLAN AP in accordance with the indication.

In an aspect of the disclosure, an apparatus for wireless communications by a user equipment (UE) is provided. The apparatus generally includes means for receiving, from a serving base station, a request to measure one or more wireless local area network (WLAN) access points (APs), means for determining one or more metrics for the WLAN APs based on the request, means for comparing the metrics for the WLAN APs to a threshold, and means for reporting at least a first AP of the WLAN APs if the metrics for the first AP exceed the threshold.

In an aspect of the disclosure, an apparatus for wireless communications by a base station is provided. The apparatus generally includes means for transmitting, to a user equipment (UE), a request to measure one or more wireless local area network (WLAN) access points (APs), and means for receiving a report for at least a first AP of the WLAN APs if measurements for the first AP exceed a threshold.

In an aspect of the disclosure, an apparatus for wireless communications by a user equipment (UE) is provided. The apparatus generally includes means for determining if a serving base station supports wireless local area network (WLAN) and radio access network (RAN) interworking, and means for determining whether to access the serving base station before associating or exchanging transmissions with a WLAN access point (AP) based upon the result of determining if a serving base station supports wireless local area network (WLAN) and radio access network (RAN) interworking.

In an aspect of the disclosure, an apparatus for wireless communications by a wireless local area network (WLAN) access point (AP) is provided. The apparatus generally includes means for receiving an indication of timing of advertisements, and means for synchronizing beacons associated with the WLAN AP in accordance with the indication.

In an aspect of the disclosure, an apparatus for wireless communications by a user equipment (UE) is provided. The apparatus generally includes at least one processor configured to receive, from a serving base station, a request to measure one or more wireless local area network (WLAN) access points (APs), determine one or more metrics for the WLAN APs based on the request, compare the metrics for the WLAN APs to a threshold, and report at least a first AP of the WLAN APs if the metrics for the first AP exceed the threshold; and a memory coupled with the at least one processor.

In an aspect of the disclosure, an apparatus for wireless communications by a base station is provided. The apparatus generally includes at least one processor configured to transmit, to a user equipment (UE), a request to measure one or more wireless local area network (WLAN) access points (APs), and receive a report for at least a first AP of the WLAN APs if measurements for the first AP exceed a threshold; and a memory coupled with the at least one processor.

In an aspect of the disclosure, an apparatus for wireless communications by a user equipment (UE) is provided. The apparatus generally includes at least one processor configured to determine if a serving base station supports wireless local area network (WLAN) and radio access network (RAN) interworking, and determine whether to access the serving base station before associating or exchanging transmissions with a WLAN access point (AP) based upon the result of determining if a serving base station supports wireless local area network (WLAN) and radio access network (RAN) interworking; and a memory coupled with the at least one processor.

In an aspect of the disclosure, an apparatus for wireless communications by a wireless local area network (WLAN) access point (AP) is provided. The apparatus generally includes at least one processor configured to receive an indication of timing of advertisements, and synchronize beacons associated with the WLAN AP in accordance with the indication; and a memory coupled with the at least one processor.

In an aspect of the disclosure, a computer program product for wireless communications comprising a computer readable medium having instructions stored thereon is provided. The instructions are generally executable by one or more processors for receiving, from a serving base station, a request to measure one or more wireless local area network (WLAN) access points (APs), determining one or more metrics for the WLAN APs based on the request, comparing the metrics for the WLAN APs to a threshold, and reporting at least a first AP of the WLAN APs if the metrics for the first AP exceed the threshold.

In an aspect of the disclosure, a computer program product for wireless communications comprising a computer readable medium having instructions stored thereon is provided. The instructions are generally executable by one or more processors for transmitting, to a user equipment (UE), a request to measure one or more wireless local area network (WLAN) access points (APs), and receiving a report for at least a first AP of the WLAN APs if measurements for the first AP exceed a threshold.

In an aspect of the disclosure, a computer program product for wireless communications comprising a computer readable medium having instructions stored thereon is provided. The instructions are generally executable by one or more processors for determining if a serving base station supports wireless local area network (WLAN) and radio access network (RAN) interworking, and based upon the determination, determining whether to access the serving base station before associating or exchanging transmissions with a WLAN access point (AP).

In an aspect of the disclosure, a computer program product for wireless communications comprising a computer readable medium having instructions stored thereon is provided. The instructions are generally executable by one or more processors for receiving an indication of timing of advertisements, and synchronizing beacons associated with the WLAN AP in accordance with the indication.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
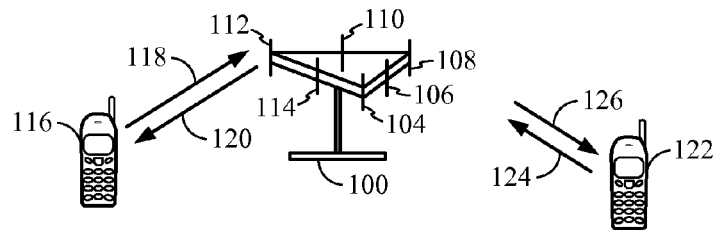
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated in which procedures described for reducing the time to begin acquisition of wireless networks may be performed. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
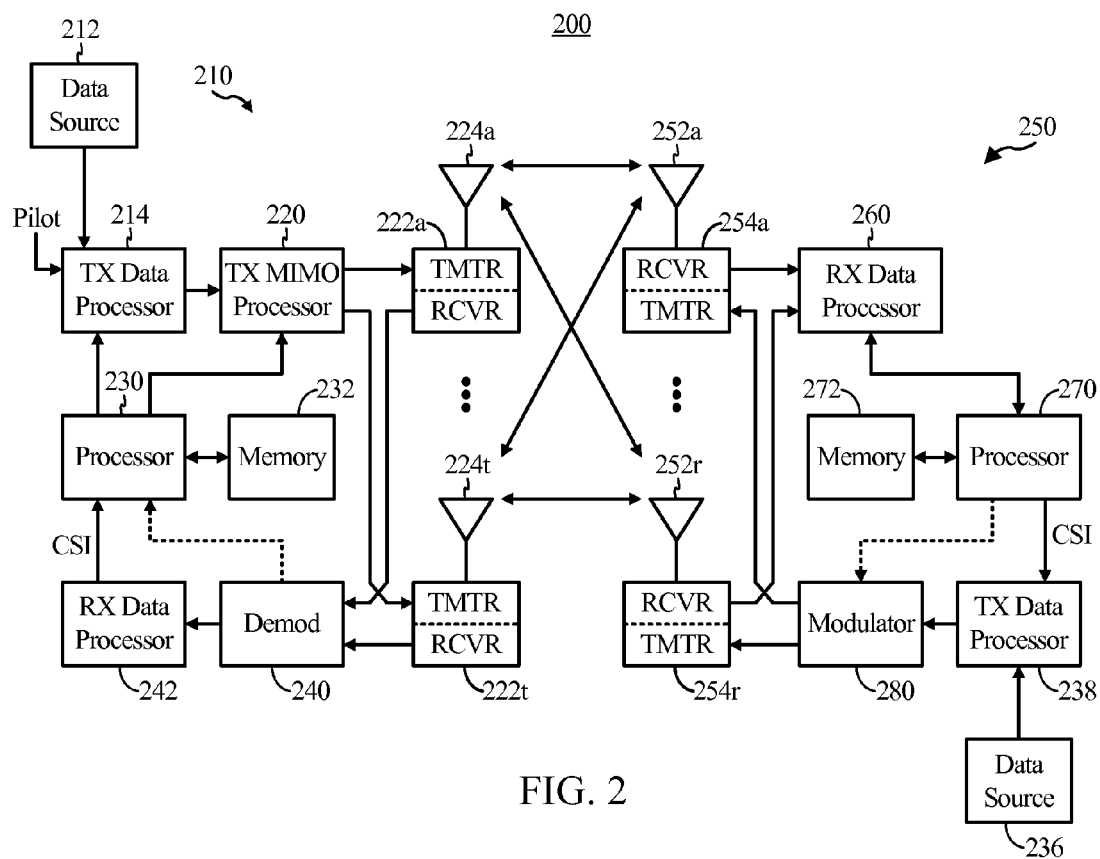
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
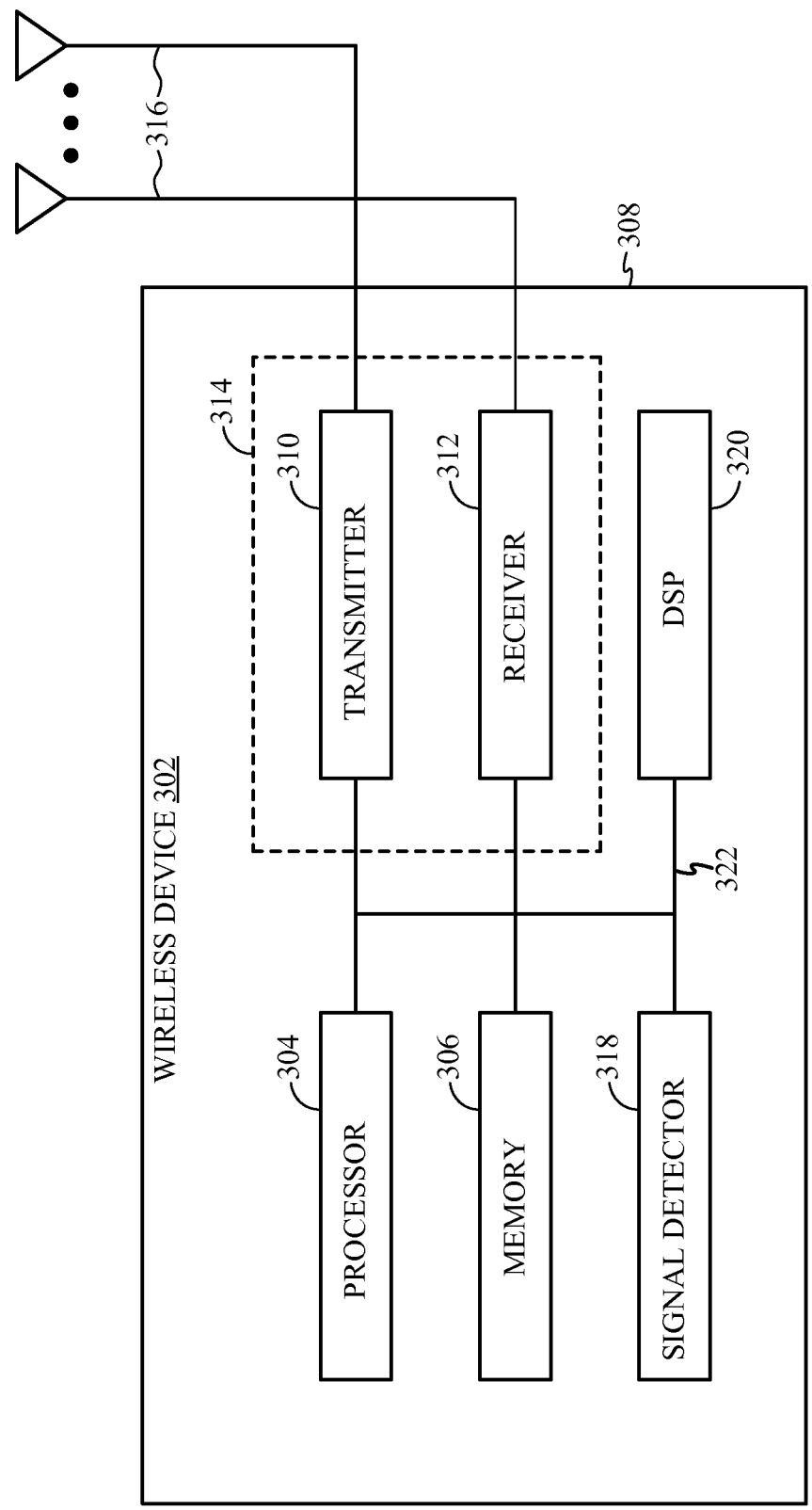
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
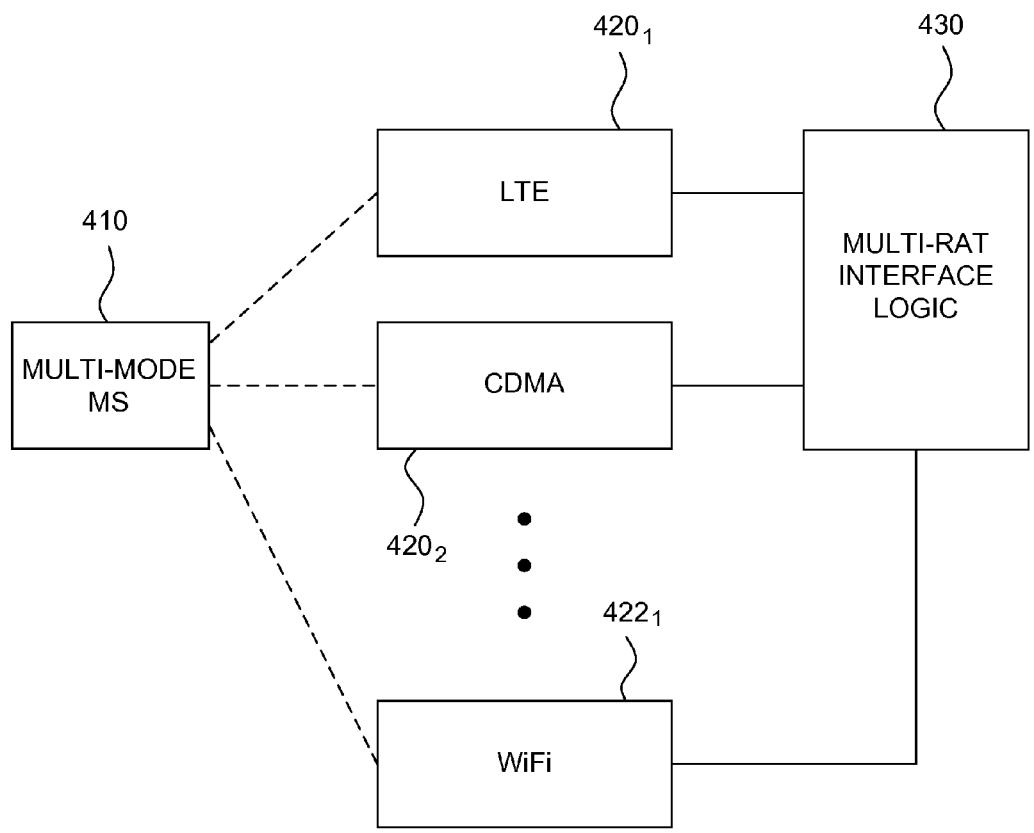
FIG. 4 illustrates an example multi-mode mobile station, in accordance with certain aspects of the present disclosure.

In order to expand the services available to subscribers, some MSs may support communications with multiple radio access technologies (RATs). For example, as illustrated in FIG. 4, a multi-mode MS 410 may support LTE for broadband data services and code division multiple access (CDMA) for voice services. Illustratively, LTE is shown as a first RAT $420_1$, CDMA is shown as a second RAT $420_2$, and Wi-Fi is shown as a third RAT $422_1$).

In certain applications, multi-RAT interface logic 430 may be used to exchange information between both long-range and short-range RATs. This may enable a network provider to control how (through which RAT) an end user of the multi-mode MS 410 actually connects to the network. The interface logic 430 may, for example, support local IP connectivity or IP connectivity to a core network.

For example, a network provider may be able to direct the multi-mode MS to connect to the network via short-range RAT, when available. This capability may allow a network provider to route traffic in a manner that eases congestion of particular air resources. In effect, the network provider may use short-range RATs to distribute some air traffic (of a long-range RAT) into a wireline network or to distribute some air traffic from a congested wireless network to a less congested wireless network. The traffic may be re-routed from the short-range RAT when conditions mandate, such as when a mobile user increases speed to a certain level not suitable for a short-range RAT.

Further, since long-range RATs are typically designed to provide service over several kilometers, the power consumption of transmissions from a multi-mode MS when using a long-range RAT is non-trivial. In contrast, short-range RATs (e.g., Wi-Fi) are designed to provide service over several hundred meters. Accordingly, utilizing a short-range RAT when available may result in less power consumption by the multi-mode MS 410 and, consequently, longer battery life.

System and Method of Offloading Traffic to a Wireless Local Area Network

Figure 5:
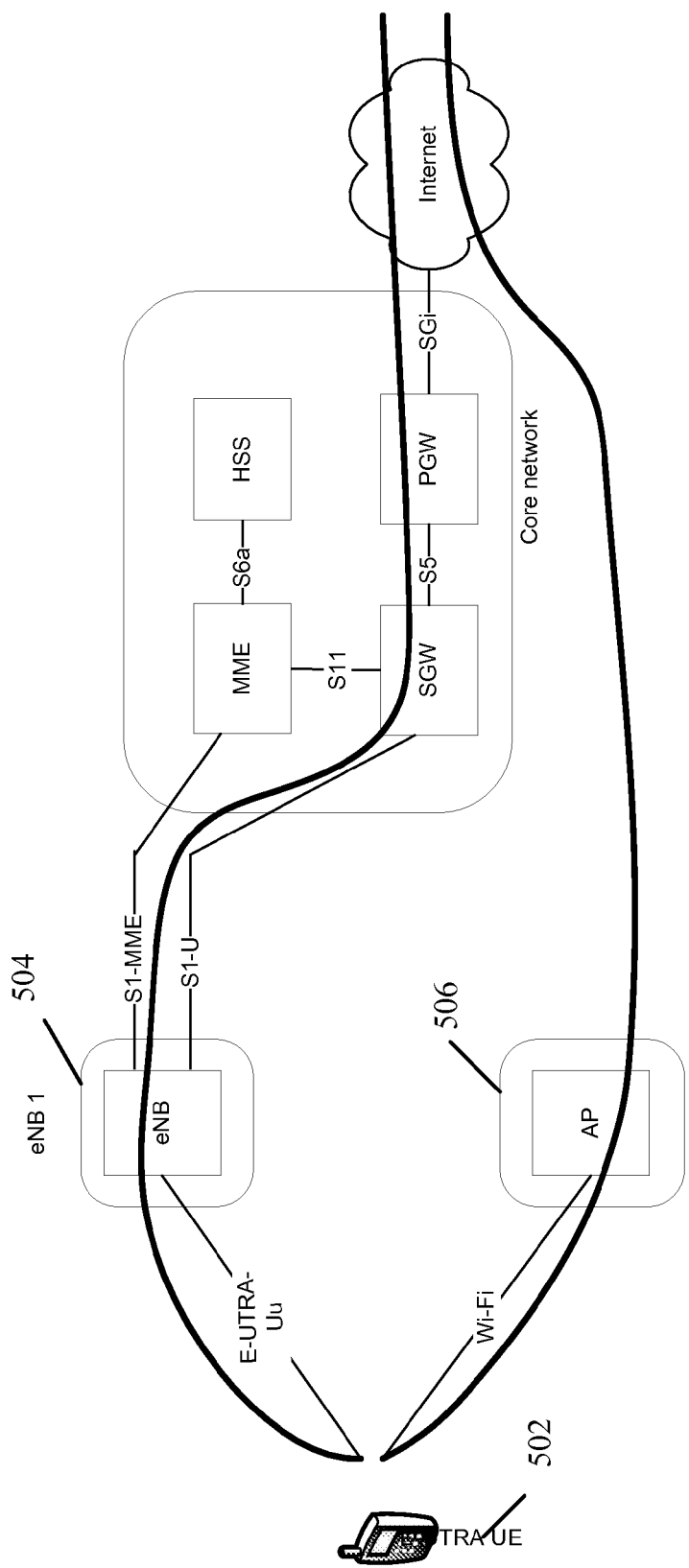
FIG. 5 illustrates an example architecture for a wireless local area network (WLAN) and a 3GPP access interworking with non seamless mobility.

FIG. 5 illustrates an example architecture for a wireless local area network (WLAN) and a 3GPP access interworking with non-seamless mobility. In such an architecture, a user equipment (UE) 502 may use different Internet protocol (IP) addresses at eNB 1 504 and WLAN AP 506.

The UE 502 may use separate packet data network (PDN) connections. The data planes for WLAN and 3GPP are essentially independent, and there is no session continuity (e.g., mobility support for the WLAN). In other words, the UE 502 may find a WLAN AP independently (e.g., with no assistance from the 3GPP network), which may be inefficient.

Certain aspects of the present disclosure, however, provide techniques for a cellular network controlling a UE accessing and offloading traffic to a WLAN. In this manner, a UE may become aware of WLAN APs by performing scanning procedures as specified in 802.11, which generally includes passive scanning and active scanning.

Passive scanning, as defined in 802.11, may be inefficient for the UE, as it must wait, with receiver on, for the reception of a WLAN beacon. As the beacon transmission interval is on the order of a hundred milliseconds, this may result in high scan energy and high scan latency with dozens of channels to scan. Active scanning may be faster, but adds traffic to the WLAN, namely probe requests and probe responses. Active scanning is also power intensive.

Some standards (e.g., 802.11u) have defined additional mechanisms for a UE to discover further information about an AP without being associated with the AP. For example, a generic advertisement service (GAS) may provide a transport of an advertisement protocol's frames between the UE and a server in the network. In this scenario, the AP may be responsible for the relay of a mobile device's query to a server in the carrier's network and for delivering the server's response back to the mobile.

An example of another mechanism includes access network query protocol (ANQP), which is generally a query advertisement protocol for access network information retrieval by the UE/STA from the AP which is transported over the GAS, including a Hotspot operator's domain name, roaming partners accessible via the Hotspot along with their credential type and EAP method supported for authentication, IP address type availability, and other metadata useful in the UE's network selection process.

A UE may not have to associate with a WLAN AP in order to provide measurements. The UE may support a subset of additional procedures as defined in 802.11k, 802.11u and Hotspot 2.0.

With regards to a radio access network (RAN), there may be no interface between the AP and the BS, as illustrated in FIG. 5. Even though this is expected to operate for operator controlled WLAN APs, no loading or neighbor information is expected to be exchanged over the backhaul. However, in the case of a collocated AP and BS, 802.11k, 802.11u, and Hotspot 2.0 information on the AP may be known in the BS (e.g., via a backhaul link) and the UE may not be required to perform ANQP to acquire the information.

When efficient passive scanning is enabled, the AP may transmit its beacons at the time advertised by the RAN. In other words, the AP may be required to acquire cellular timing and SFN, and know beacon transmission times advertised by the RAN. For certain aspects, two levels of reporting may be required to identify the AP: identifying the AP (e.g., based on BSSID), i.e., from beacon only, and providing 802.11k, 802.11u, or Hotspot 2.0 identifying information using ANQP (e.g., in the case of a non-collocated AP and eNB). For certain aspects, it is possible to have a backhaul interface to exchange this information not shown in the figure.

Figure 6:
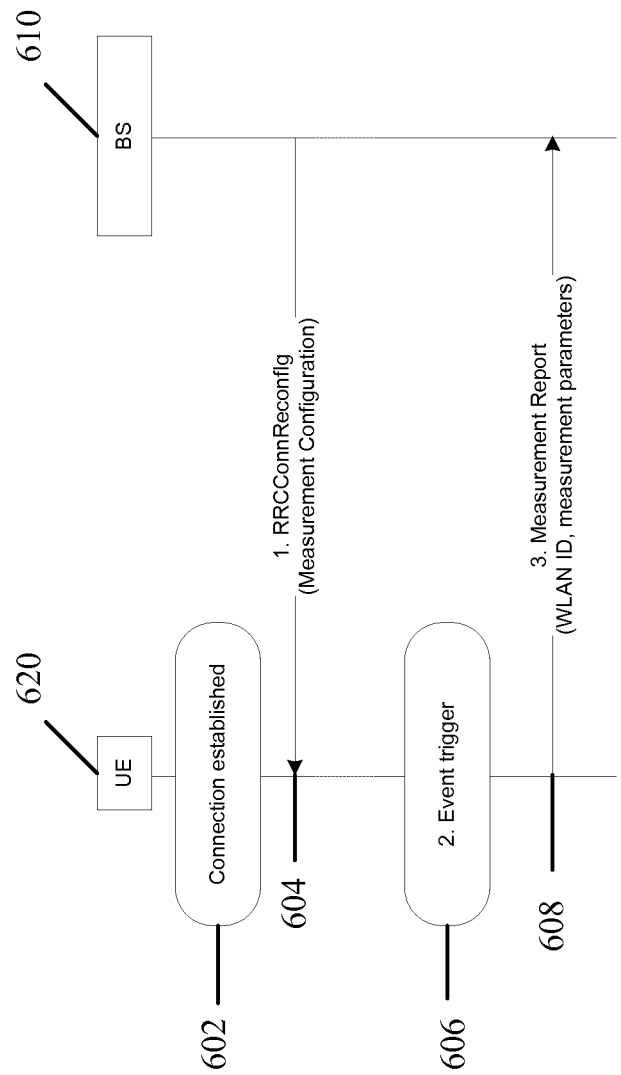
FIG. 6 illustrates example RF measurement procedures for a WLAN booster AP, in accordance with certain aspects of the present disclosure.

FIG. 6 illustrates RF measurement procedures for a WLAN booster AP, in accordance with certain aspects of the present disclosure. At the time a connection is established (at 602), or based on some event, a base station (BS) 610 (e.g., anchor eNB) may provide measurement configuration to the UE 620 (at 604).

The measurement configuration may allow a UE to rely on passive scanning by informing the transmission time of a WLAN beacon relative to RAN timing. The measurement configuration may be event driven. In addition, periodic measurement reporting may also be possible, although event driven measurement configuration may be sufficient.

The measurement configuration may define the target WLAN APs to report by a target identifier (e.g., corresponding to a specific WLAN AP or a group of WLAN APs), a target frequency (e.g., corresponding to a specific WLAN channel or a WLAN band), and a beacon timing relative to the RAN timing, to enable power and spectral efficient WLAN passive scanning for the UE. As an example, the beacon may transmitted regularly (e.g., when LTE's SFN mod 10=0). Various types of target frequencies may be considered for WLAN measurements, such as operating class (e.g., see Annex E of 802.11 for definitions of the different operating classes) and channel number (including operating class).

Various types of target identifiers may be considered for WLAN measurements. Examples include, but are not limited to a Network Access Identifier Home Realm (NAIHR), a service set identifier (SSID), a basic SSID (BSSID), a homogeneous extended SSID (HESSID), or 3rd Generation Partnership Project (3GPP) cellular network information. Additional target identifiers for a group of WLAN APs may also be defined. BSSID may be used to search for a specific WLAN AP (e.g., in the case collocated WLAN and BS).

The NAIHR allows the UE to determine if the network access identifier (NAI) realms for which it has security credentials are realms corresponding to SPs or other entities whose networks or services are accessible via this BSS. BSSID is generally used to identify an individual AP, whereas other measurement targets are generally used to identify an extended service set (ESS). SSID may be used to search for a specific SSID, which may represent a WLAN service provider (SP). HESSID may be use to search for a specific Hotspot SP (included in the Interworking IE (802.11u) as part of the beacon or Probe Response). HESSID is generally more controlled than SSID-based search but assumes Hotspot support at the WLAN. 3GPP cellular network information may be use to search for a specific public land mobile network (PLMN) (802.11u).

The measurement configuration may define the set of WLAN measurement events as follows. In a first event (Event C1), the WLAN may become better than an absolute threshold (e.g., to trigger association with WLAN). In a second event (Event C2), the WLAN becomes worse than an absolute threshold (e.g., to trigger disassociation with WLAN). In a third event (Event C3), the WLAN neighbor offset becomes better than serving WLAN (e.g., to trigger handover between WLAN APs).

Event C1 may be used to trigger offload from a cellular network (e.g., LTE) to WLAN. For example, if:

$$Ms-Hys>\text{Thresh}$$

or $$\text{load}+\text{load}Hys<\text{loadThresh},$$

the UE may associate with the WLAN (i.e., if the UE is not already connected to a WLAN). However, if:

$$Ms+Hys<\text{Thresh}$$

or $$\text{load}-\text{load}Hys>\text{loadThresh}$$

the UE may disassociate with the WLAN. Disassociation may include disassociate at the Layer 2 and tear down of the authentication and network protocol states. The variables in the formula are defined as follows: -Ms is the measurement result of the WLAN, not taking into account any offsets (Ms is expressed in dBm in case of RCPI, or in dB in case of RSNI), -Hys is the hysteresis parameter for this event (e.g., hysteresis as defined within reportConfigEUTRA for this event also expressed in dB), -Thresh is the threshold parameter for this event (e.g., c1-Threshold as defined within reportConfigEUTRA for this event and expressed in the same unit as Ms), -load is the channel load (indicated in the beacon's BSS load element, range 0-255, or Alternatively, load could be the channel load calculated at the UE), -loadHys is expressed as an integer 0-255, and -loadThresh is expressed in the same unit at loadHys. According to certain aspects, the measurement may alternatively be defined to just measure one of Ms or load (i.e., not consider both conditions).

Event C2 may be used to trigger fallback from WLAN to a cellular network. For example, if:

$$Ms+Hys<\text{Thresh}$$

or $$\text{load}-\text{load}Hys>\text{loadThresh}$$

the UE may disassociate with the WLAN. However, if:

$$Ms-Hys>\text{Thresh}$$

or $$\text{load}+\text{load}Hys<\text{loadThresh}$$

the UE may associate with the WLAN (i.e., if the UE is not already connected to a WLAN). The variables in the formula are defined as follows: -Thresh is the threshold parameter for this event (i.e. c2-Threshold as defined within reportConfigEUTRA for this event). According to certain aspects, the measurement may alternatively be defined to just measure one of Ms or load (i.e., not consider both conditions).

Event C3 may be used to trigger intra-WLAN handover. For example, if:

$$Mn+Ofn-Ocn-Hys>Mp+Ofp+Ocp+\text{Off},$$

the UE may disassociate with a serving WLAN and associate with a neighboring WLAN. However, if:

$$Mn+Ofn+Ocn+Hys<Mp+Ofp+Ocp+\text{Off},$$

the UE may remain associated with the serving WLAN. The variables in the formula are defined as follows: -Mn is the measurement result of the neighboring WLAN, not taking into account any offsets, -Ofn is the frequency specific offset of the frequency of the neighbor WLAN (e.g., offsetFreq as defined within measObjectEUTRA corresponding to the frequency of the neighbor WLAN), -Ocn is the WLAN specific offset of the neighbor WLAN (e.g., WLANIndividualOffset as defined within measObjectEUTRA corresponding to the frequency of the neighbor WLAN), and set to zero if not configured for the neighbor WLAN, -Mp is the measurement result of the serving WLAN, not taking into account any offsets, -Ofp is the frequency specific offset of the primary frequency (e.g., offsetFreq as defined within measObjectEUTRA corresponding to the primary frequency), -Ocp is the WLAN specific offset of the serving WLAN (e.g., WLANIndividualOffset as defined within measObjectEUTRA corresponding to the primary frequency), and is set to zero if not configured for the Serving WLAN, -Hys is the hysteresis parameter for this event (e.g., hysteresis as defined within reportConfigEUTRA for this event), -Off is the offset parameter for this event (e.g., a3-Offset as defined within reportConfigEUTRA for this event), -Mn, Mp are expressed in dBm in case of RCPI, or in dB in case of RSNI, and -Ofn, Ocn, Ofp, Ocp, Hys, Off are expressed in dB.

The measurement may alternatively be defined to also measure load as well (e.g., consider both conditions, or just load individually). An alternative would be to allow the UE to manage connectivity to the WLAN and only report the serving AP to the RAN. One issue with this would be how it impacts the scenario where the LTE and WLAN are collocated. This is because the RAN makes the HO decision for LTE and the UE makes the HO decision for WLAN. Therefore, when LTE and WLAN are collocated it makes sense to have a single common decision point Referring back to FIG. 6, after a period of time, an event may trigger the UE 620 to provide a measurement report (at 606). The UE 620 may send the measurement report message using the radio resource control (RRC) over the radio access network (RAN) (at 608). The measurement report generally includes a target identifier and measurements for the WLAN.

Over-the-air (OTA) information elements (IEs) and/or IEs related to 802.11u, 802.11k or Hotspot 2.0 may be included in the WLAN measurement reports. OTA IEs may be based on measurements by the UE of the WLAN or an IE received in the beacon from or probe response the WLAN AP. 802.11u, 802.11k or Hotspot 2.0 IEs may be based on signaling over ANQP between the UE and the WLAN or an IE received in the beacon or probe response from the WLAN AP. For certain aspects, 802.11u, 802.11k and Hotspot 2.0 IEs may be already known at the BS in the case of a collocated BS and WLAN, or due to a new interface defined between the BS and WLAN AP.

The WLAN target AP identification IEs may be the same as those used for the measurement configuration described above. The measurement report defines the target WLAN APs by a target identifier and a target frequency. The target identifier may correspond to one or more identifiers of a WLAN AP, or a group of WLAN APs (e.g., BSSID, SSID, HESSID, 3GPP cellular network information). Target frequency may correspond to a specific WLAN channel or a WLAN band (e.g., operating class, channel number). When the UE is already connected to an operator WLAN AP, the UE may report the associated BSSID and indicate that it is already connected to the WLAN AP via the alreadyConnected IE.

OTA measurements may be sent by the UE over RRC based on measurements by the UE of the WLAN or an IE received in the beacon from the WLAN AP. Examples of the WLAN target AP measurements generally include a received signal strength indicator (RSSI), a received channel power indicator (RCPI) measurement, a received signal to noise indicator (RSNI) measurement, a channel load, WAN metrics, and a BSS load. The RSSI measurement may include a scaled measure of the total received power. The RCPI measurement may provide a measure of the received RF power in the selected channel for a received frame in the range of −110 to 0 dBm (STA measurement). The RSNI measurement may provide an indication of the signal to noise plus interference ratio of a received IEEE 802.11 frame (STA measurement). The channel load may contain the proportion of measurement duration for which the measuring STA determined the channel to be busy either through the physical carrier sense or as indicated in the NAV (STA measurement).

WAN metrics may contain information about the WAN such as link status, backhaul speeds and loading (Hotspot 2.0). The BSS load may contain information on the current STA population and traffic levels in the BSS (802.11k). In addition to the target AP measurements described above, additional target AP measurements may also be defined. For example, statistics on frame error rates to decide to disassociate or HO from WLAN may be considered. The following table provides a summary of IEs that may be reported by the UE in RRC:

| Information Element | Availability in WLAN |
| --- | --- |
| BSSID | Beacon or Probe Response |
| SSID | Beacon or Probe Response |
| HESSID | Beacon or Probe Response (802.11u) |
| Operating class, channel number | Measurement |
| 3GPP Cellular Network Info | ANQP (802.11u) |
| Received Channel Power Indicator (RCPI) | Measurement |
| Received Signal to Noise Indicator (RSNI) | Measurement |
| Channel load | Measurement |
| WAN metrics | ANQP (HS 2.0) |
| BSS load | Beacon or Probe Response (802.11k) |
| Already Connected | Set to 1 if already connected to this BSSID, SSID or HESSID |

Figure 7:
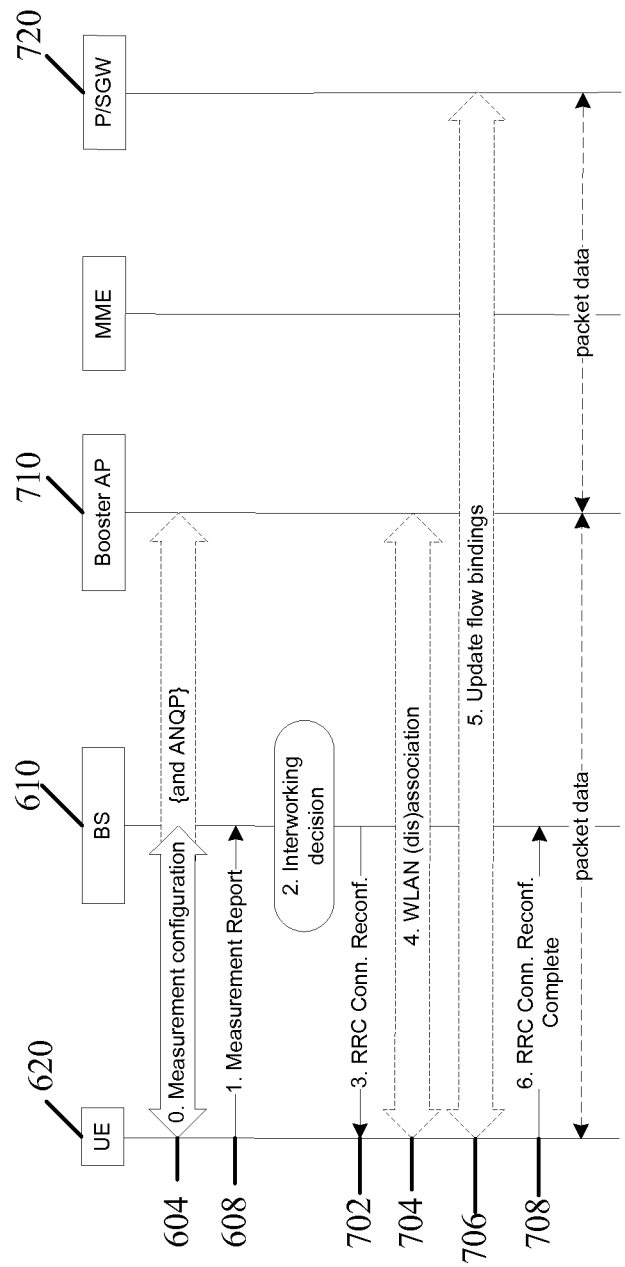
FIG. 7 illustrates an example WLAN mobility procedure call flow, in accordance with certain aspects of the present disclosure.

FIG. 7 illustrates an example WLAN mobility procedure call flow, in accordance with certain aspects of the present disclosure. More specifically, FIG. 7 illustrates an anchor to WLAN booster offload procedure for the evolved packet system (EPS) bearers terminating at a core network (CN). As shown, the UE 620 may perform measurement procedures (at 604) and send a measurement report message using the RRC over the RAN (at 608), as also done in FIG. 6.

Based on the measurement report, the BS 610 may determine which E-UTRAN radio access bearers (ERABs) to offload to the booster AP 710. The BS 610 may send an RRCConnectionReconfiguration message to the UE (at 702). According to certain aspects, the BS 610 may trigger the mobility procedure, for example, based on radio conditions and/or load. For certain aspects, the BS may also initiate offload procedure blindly (e.g., without having received measurement reports from the UE).

At least two types of mobility to WLAN procedures may be defined (e.g., based on static policy or dynamic policy). According to certain aspects, the BS 610 may trigger the UE association or disassociation from WLAN. The actual IP flows that are offloaded by the UE 620 may be based on a static policy, for example, an access network discovery and selection function (ANDSF) as configured on the UE 620 by the CN or dynamic policy based on a S2a-based mobility over GPRS tunneling protocol (SaMOG) controlled by the CN and propagated to the UE 620.

The IE WLANMobilityInfo may include parameters relevant for a network controlled mobility to/within WLAN based on static policy:

| WLANMobilityInfo field descriptions (static policy) |
| --- |
| WLAN-Channel |
| The Operating class and Channel number of the target WLAN AP. |
| WLAN-ID |
| The BSSID or SSID of the target WLAN AP. |
| Association |
| If present indicates the UE should associate with the target WLAN AP if the UE is not already associated. If absent the UE should disassociate. |

According to certain aspects, in addition to the WLANMobilityInfo parameters needed for network controlled mobility to/within WLAN based on static policy, the BS 610 may trigger the UE 620 to add, remove, or modify which IP flows or access point name (APN) traffic to offload by means of the WLANRoutingInfo field in the RRCConnectionReconfiguration message (e.g., based on a dynamic policy in the RAN). This is illustrated by the following:

| WLANRoutingInfo field descriptions (dynamic policy) |
| --- |
| RoutingPolicy |
| Indicates whether the routing policy corresponds to IFOM (i.e., flow based), MAPCON (i.e., APN based) or non-seamless WLAN offload. Values are ENUM {IFOM, MAPCON, NON-SEAMLESS-OFFLOAD, BEARER} |
| IFOM |
| Sequence of one or more WLANFlowInfo fields. The field is present in a RoutingPolicy is set to IFOM. |
| MAPCON |
| Sequence of one or more APN IEs. The field is present in a RoutingPolicy is set to MAPCON. |
| Non-seamlessWLANoffload |
| Sequence of one or more WLANFlowInfo fields. The field is present in a RoutingPolicy is set to NON-SEAMLESS-OFFLOAD. |
| Bearer |
| Sequence of one or more Bearer IEs corresponding to active radio bearers on the 3GPP interface, i.e., logical channel ID. The field is present in a RoutingPolicy is set to BEARER. |

To implement a dynamic policy, the RAN may need to know if the UE 620 is using IP flow mobility (IFOM) or multi-access PDN connectivity (MAPCON) for a seamless WLAN offload in order to propagate the correct types of policies to the UE (i.e., IP flow or APN offload, respectively). This information may be included in the UE context received over S1 when the connection is established and propagated in the handover (HO) messages. Alternatively, this information may be indicated by the UE as a capability in the connection establishment and included in the context when the UE is handed over. Fields in the WLANFlowInfo IE generally include the following:

| WLANFlowInfo field descriptions |
| --- |
| AddressType |
| Indicates the IP version of the addresses describing the IP flow, IPv4 or IPv6. If absent then both IPv4 and IPv6 addresses are okay. This field is required if the SourceAddressRange or DestinationAddressRange are present. SourceAddressRange |
| The starting and ending source IP address of the data packets. If absent then the source address field of the IP header is not examined when matching packets. DestinationAddressRange |
| The starting and ending destination IP address of the data packets. If absent then the destination address field of the IP header is not examined when matching packets. ProtocolType |
| Indicates the Internet protocol numbers as defined in IANA Assigned Internet Protocol Numbers. In case of IPv4, the value is compared with the value of the last protocol type field. In case of IPv6, the value is compared with the value of the last next header field. SourcePortRange |
| The starting and ending source port numbers of the data packets. If absent then the source port of the IP header is not examined when matching packets. DestinationPortRange |
| The starting and ending destination port numbers of the data packets. If absent then the destination port of the IP header is not examined when matching packets. QoS |
| Indicates the DS or ToS values as defined in IETF RFC 3260 DomainName |
| Indicates the destination domain name as defined by a Fully Qualified Domain Name (FQDN), e.g. www.example.com, that was resolved into the destination IP address. The FQDN format is defined in IETF RFC 2181, IETF RFC 1035 and IETF RFC 1123. ApplicationID |
| The application identifier is a character string assigned by the application developer and is associated with a given application. The application identifier uniquely identifies the application within the UE's application repository. |

Referring back to FIG. 7, the UE 620 may perform (dis)association with the AP 710 based on the RRCConnectionReconfiguration message (at 704). In the case of dual-stack mobile IPv6 (DSMIPv6), any binding updates to the PGW 720 may also be sent for IP address continuity (at 706). The UE 620 may send UL data and receive DL data to the booster AP 710. When no IP address continuity is available, the UE 620 may continue to send the traffic associated with pre-existing connections over the RAN interface. However, new connections may obey the signaled mapping. At 708, the UE 620 may send an RRCConnectionReconfiguration-Complete message to the BS 610.

Figure 8:
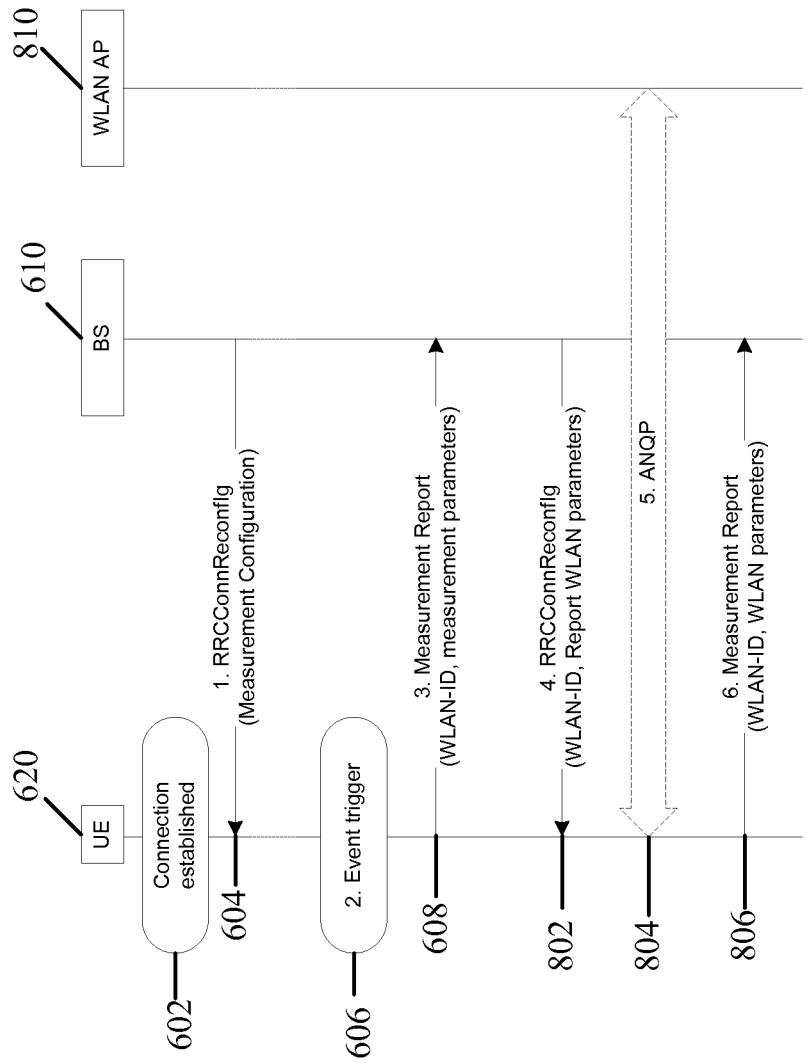
FIG. 8 illustrates an example automatic WLAN neighbor relation procedures for a WLAN booster AP, in accordance with certain aspects of the present disclosure.

FIG. 8 illustrates example automatic WLAN neighbor relation procedures for a WLAN booster AP, in accordance with certain aspects of the present disclosure. For certain aspects, only static WLAN neighbor relation information may be reported as a part of the automatic WLAN neighbor relation procedure.

Unlike LTE measurement reports, the WLAN-ID (at 608) uniquely identifies the WLAN AP 810 and, in the case of a collocated WLAN AP and BS, or if a WLAN to eNB interface is available, the automatic WLAN neighbor relation procedures may not be needed since the information may be exchanged over the backhaul. However, in the case of a WLAN AP that is not collocated with the BS 610, at 802, the BS 610 may instruct the UE 620, using the newly discovered WLAN-ID as a parameter, to report additional WLAN parameters of the related neighbor WLAN AP 810.

At 804, the UE 620 may query the WLAN AP 810 for further information using an access network query protocol (ANQP), as defined in 802.11u and Hotspot 2.0. At 806, the UE 620 may report the WLAN parameters to the BS 610.

In some cases, certain IEs (e.g., 802.11u, 802.11k or Hotspot 2.0 IEs) may be included in the automatic WLAN neighbor relation reports. 802.11u, 802.11k or Hotspot 2.0 IEs may be based on signaling over ANQP between the UE and the WLAN or an IE received in the beacon or probe response from the WLAN AP. As described above, 802.11u, 802.11k and Hotspot 2.0 IEs may be already known at a BS in the case of a collocated BS and WLAN, or due to a new interface defined between the eNB and WLAN AP in which case automatic WLAN neighbor relation procedures are not needed.

The automatic WLAN neighbor relation reports may include a neighbor report, interworking, a roaming consortium, a network authentication type, IP address type availability, a venue name, a location, a connection capability, and an operator friendly name. A neighbor report (802.11k) generally includes information about known neighbor APs that are candidates for a service set transition. Interworking (802.11u) may indicate an access network type (e.g., free, private, Internet connectivity availability, etc.). Roaming consortium (802.11u) may provide information about the roaming Consortium or SSP whose networks are accessible via this AP (e.g., whose security credentials may be used to authenticate with the AP transmitting this element). Up to three may be listed. Network authentication type (802.11u) may provide a list of authentication types including acceptance of terms and conditions, on-line enrollment supported, HTTP/S redirection, or DNS redirection. IP address type availability (802.11u) may provide information about the availability of IP address version and type including IPv6, Public IPv4, Port-restricted IPv4, Single NATed private IPv4, Double NATed, Private IPv4, etc.

Venue name may provide zero or more venue names associated with the BSS. More than one may be included, but all may represent the same operator name in different human languages. Location (802.11u) may provide the AP's location in LCI format (e.g., latitude-longitude coordinates, or street address or as a URI). Connection Capability (Hotspot 2.0) may provide information on the connection status within the hotspot of the most commonly used communications protocols and ports. For example, a firewall upstream to the access network may allow communication on certain IP protocols and ports, while blocking communication on others. Operator friendly name (Hotspot 2.0) may provide zero or more operator names operating the IEEE 802.11 AN. More than one may be included but all represent the same operator name in different human languages. In addition to the target AP measurements described above, additional target AP measurements may be defined.

In some scenarios, the ANDSF policies may send the UE's traffic to a poor WLAN, and the RAN may not detect and fix this, since the UE is in RRC Idle. There are also scenarios where there may be tight interworking between the WLAN and RAN networks and all mobility to the WLAN may need to be coordinated at the RAN. For certain aspects, the RAN may indicate over a broadcast control channel (BCCH) if RAN-controlled WLAN offload is enabled in a cell. When enabled, a supporting UE camped on the cell may connect to the RAN for traffic and the RAN may determine which bearers are offloaded, i.e., if the UE supports ANDSF and RAN-controlled WLAN interworking, then the UE may disable ANDSF policies and connect to the RAN before associating or sending traffic over the WLAN. The RAN may then steer traffic towards WLAN, as described above.

In some cases, for example, if seamless flow mobility or WLAN and 3GPP data aggregation at a collocated WLAN and LTE/UMTS cell is supported, the network may indicate this support to the UE as the procedure may be initiated at the RAN in some instances. In this case, the UE may access the RAN first before associating and/or sending traffic to the WLAN to ensure best performance.

Figure 9:
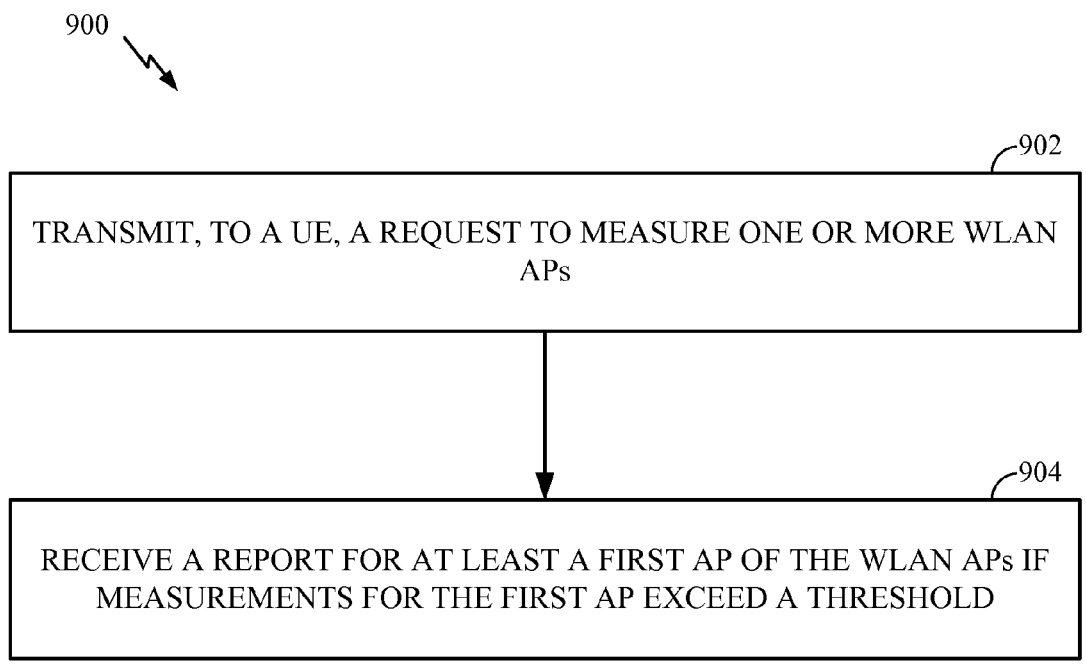
FIG. 9 illustrates example operations for offloading data transmissions from a cellular network to a WLAN AP, in accordance with certain aspects of the present disclosure.

FIG. 9 illustrates example operations 900 for offloading data transmissions from a cellular network to a WLAN AP, in accordance with certain aspects of the present disclosure. The operations 900 may be performed, for example, by a base station (BS).

At 902, the BS may transmit, to a UE, a request to measure one or more WLAN APs. At 904, the BS may receive a report for at least a first AP of the WLAN APs if measurements for the first AP exceed a threshold. Upon receiving the report of the metrics for the first AP, the BS may transmit a radio resource control (RRC) command to offload data transmissions from a cellular network to the first AP.

Figure 10:
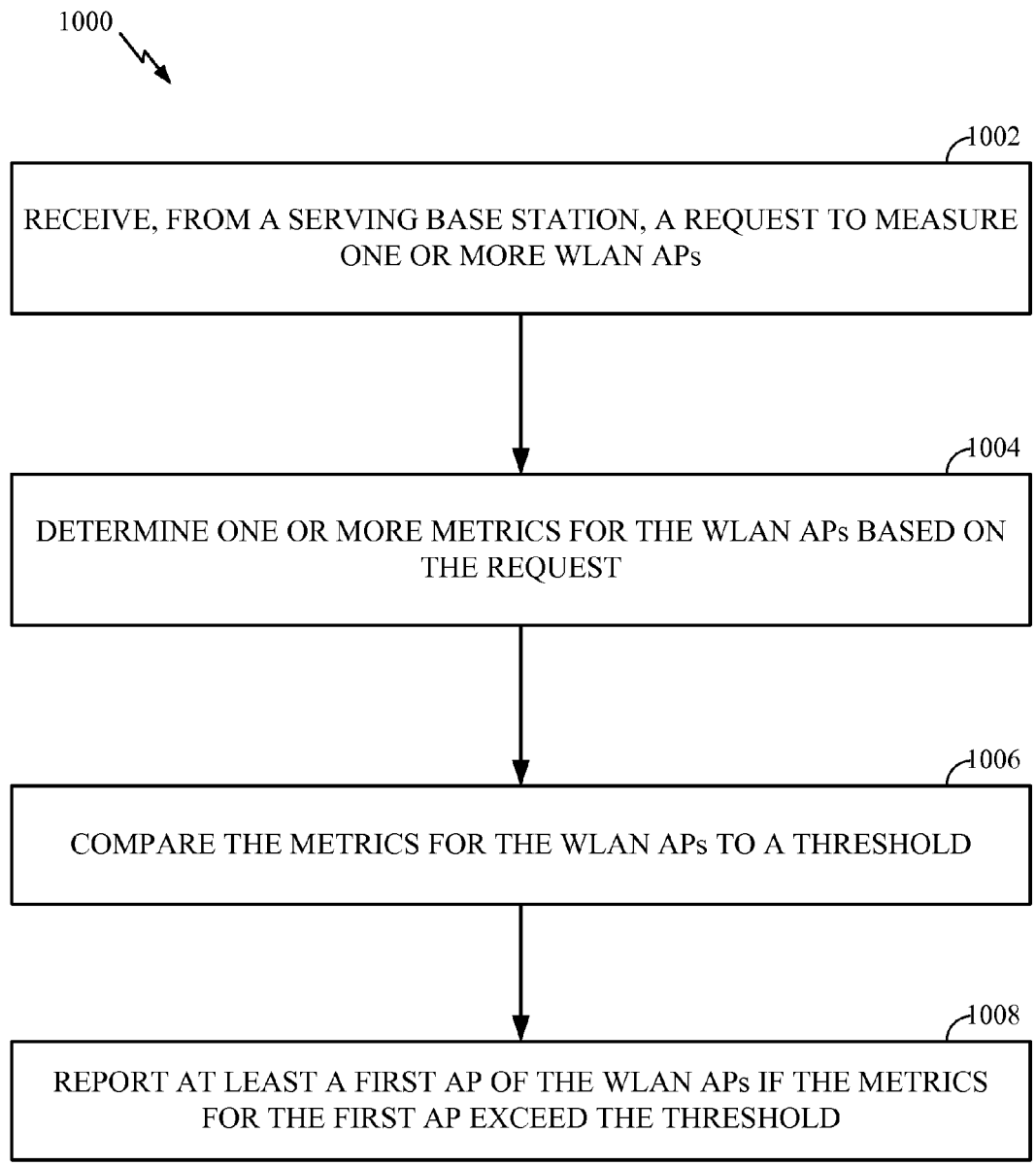
FIG. 10 illustrates example operations for reporting metrics of WLAN APs to a cellular network, in accordance with certain aspects of the present disclosure.

FIG. 10 illustrates example operations 1000 for reporting metrics of WLAN APs to a cellular network, in accordance with certain aspects of the present disclosure. The operations 1000 may be performed, for example, by a UE.

At 1002, the UE may receive, from a serving base station, a request to measure one or more WLAN APs. At 1004, the UE may determine one or more metrics for the WLAN APs based on the request. At 1006, the UE may compare the metrics for the WLAN APs to a threshold. At 1008, the UE may report at least a first AP of the WLAN APs if the metrics for the first AP exceed the threshold. Upon reporting the metrics for the first AP, the UE may receive a radio resource control (RRC) command to offload data transmissions from a cellular network to the first AP and, upon receiving the RRC command, the UE may associate with the first AP.

According to certain aspects, a UE may determine if a serving base station supports wireless local area network (WLAN) and radio access network (RAN) interworking and, based upon the determination, determining whether to access the serving base station before associating or exchanging transmissions with a WLAN access point (AP). In some cases, the determining comprises determining if the serving base station indicates over the BCCH if WLAN and RAN interworking is enabled in this cell of the serving base station.

The indication may comprises one or more of an indication of support WLAN and RAN interworking, an identifier of one or more WLAN APs, or an indication of timing of advertisements for one or more WLAN APs; and the determination comprises determining of the indication is present. The one or more WLAN APs are identified by a Network Access Identifier Home Realm (NAIHR), a service set identifier (SSID), a basic SSID (BSSID), a homogeneous extended SSID (HESSID), or 3rd Generation Partnership Project (3 GPP) cellular network information.

In some cases, the UE may access the serving base station and receiving from the serving base station, a request to measure the WLAN AP. In some cases, the UE may access the serving base station and identifying the WLAN AP as part of the access procedures. In some cases, determining whether to access the serving base station before associating or exchanging transmissions with the WLAN AP comprises determining whether a policy indicates to access the serving base station before associating or exchanging transmissions with the WLAN AP. The policy may comprise policy from a core network (CN) and, in some cases, may indicate a type of traffic for which to access the serving base station first. The type of traffic may comprise one or more Internet protocol (IP) flows, bearer, or access point name (APN) traffic.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a user equipment (UE), comprising:
receiving, from a serving base station of a Radio Access Network (RAN), a request to measure one or more wireless local area network (WLAN) access points (APs), wherein the request to measure comprises a measurement configuration that indicates to the UE a transmission time of a WLAN beacon relative to timing of the RAN;
determining one or more metrics for at least one of the one or more WLAN APs based on the request;
comparing the one or more metrics for the at least one of the one or more WLAN APs to a threshold;
reporting a first AP of the one or more WLAN APs based on the comparison;
receiving, based on the reporting, a command to offload data transmissions from a cellular network to the first AP, wherein which data transmissions are offloaded from the cellular network to the first AP is based on a first policy from a core network (CN); and determining, after receiving the command and based on a second policy from the core network, a type of traffic for which to access the serving base station before associating or exchanging transmissions with the first AP.

2. The method of claim 1, wherein the report comprises one or more of the metrics and an identifier of the first AP.

3. The method of claim 1, wherein the reporting further comprises:

reporting the UE is already connected to the first AP.

4. The method of claim 1, wherein, upon reporting the first AP, further comprising:

receiving a radio resource control (RRC) command to offload the data transmissions from the cellular network to the first AP.

5. The method of claim 1, wherein, upon reporting the first AP, further comprising:

receiving a configuration request to report additional information about the first AP.

6. The method of claim 1, wherein reporting the first AP of the WLAN APs comprises:

reporting the first AP of the one or more WLAN APs if the metrics for the first AP are below the threshold.

7. The method of claim 1, wherein determining the one or more metrics for at least one of the one or more WLAN APs comprises receiving information elements (IEs) in a beacon or a probe response from the at least one of the one or more WLAN APs.

8. The method of claim 1, wherein the one or more WLAN APs correspond to a specific WLAN channel or a WLAN band.

9. The method of claim 1, wherein the one or more WLAN APs are identified by a Network Access Identifier Home Realm (NAIHR), a service set identifier (SSID), a basic SSID (BSSID), a homogeneous extended SSID (HESSID), or $3^{rd}$ Generation Partnership Project (3GPP) cellular network information.

10. The method of claim 1, wherein reporting the first AP of the one or more WLAN APs comprises:

reporting the first AP if the one or more metrics for the first AP exceed the threshold.

11. The method of claim 1, further comprising:

determining if the serving base station supports WLAN and radio access network (RAN) interworking; and based upon the determination, determining whether to access the serving base station before associating or exchanging transmissions with a WLAN AP.

12. The method of claim 2, wherein the one or more metrics comprise a received signal strength indicator (RSSI), a received channel power indicator (RCPI), a received signal to noise indicator (RSNI), a basic service set (BSS) load, a channel load, or wide area network (WAN) metrics.

13. The method of claim 4, further comprising associating with the first AP upon receiving the RRC command.

14. The method of claim 4, wherein the RRC command comprises an identifier of the first AP.

15. The method of claim 4, wherein the RRC command further comprises Internet protocol (IP) flows, bearer, or access point name (APN) traffic to offload from the cellular network to the first AP.

16. The method of claim 5, wherein reporting the additional information about the first AP comprises performing an access network query protocol (ANQP) with the first AP.

17. The method of claim 6, wherein upon reporting for the first AP, further comprising:

receiving a radio resource control (RRC) command to disassociate with the first AP.

18. The method of claim 15, wherein the IP flows or the APN traffic to offload are designated as one or more of seamless or non seamless connectivity.

19. The method of claim 17, wherein disassociating with the first AP comprises offloading data transmissions from the first AP to a cellular network.

20. The method of claim 18, wherein the seamless connectivity comprises Internet protocol flow mobility (IFOM) or multi-access packet data network connectivity (MAPCON).

21. A method for wireless communications by a base station of a Radio Access Network (RAN), comprising:

transmitting, to a user equipment (UE), a request to measure one or more wireless local area network (WLAN) access points (APs), wherein the request to measure comprises a measurement configuration that indicates to the UE a transmission time of a WLAN beacon relative to timing of the RAN;

receiving a report for a first AP of the one or more WLAN APs; and transmitting, based on the report, a command to offload data transmissions from a cellular network to the first AP, wherein which data transmissions are offloaded from the cellular network to the first AP is based on a first policy from a core network (CN), wherein a second policy from the CN indicates a type of traffic for which the UE, after receiving the command, is to access the base station before associating or exchanging transmissions with the first AP.

22. The method of claim 21, wherein the report comprises one or more of the metrics and an identifier of the first AP.

23. The method of claim 21, wherein the report comprises an indication the UE is already connected to the first AP.

24. The method of claim 21, wherein, upon receiving the report for the first AP, further comprising:

transmitting a radio resource control (RRC) command to offload the data transmissions from the cellular network to the first AP.

25. The method of claim 21, wherein, upon receiving the report for the first AP, further comprising:

transmitting a radio resource control (RRC) command to offload data transmissions from a serving WLAN AP to the first AP.

26. The method of claim 21, wherein, upon receiving the report for the first AP, further comprising:

determining whether additional information about the first AP is required; and upon determining the additional information is required, transmitting, to the UE, a configuration request to report additional information about the first AP.

27. The method of claim 21, wherein receiving the report comprises:

receiving the report of the first AP of the one or more WLAN APs if measurements for the first AP are below the threshold.

28. The method of claim 21, wherein the one or more WLAN APs correspond to a specific WLAN channel or a WLAN band.

29. The method of claim 21, wherein the one or more WLAN APs are identified by a service set identifier (SSID), a basic SSID (BSSID), a homogeneous extended SSID (HESSID), or $3^{rd}$ Generation Partnership Project (3GPP) cellular network information.

30. The method of claim 21, wherein receiving the report comprises:
   receiving the report of the first AP of the WLAN APs if measurements for the first AP exceed a threshold.

31. The method of claim 22, wherein the one or more metrics comprise a received signal strength indicator (RSSI), a received channel power indicator (RCPI), a received signal to noise indicator (RSNI), a basic service set (BSS) load, a channel load, or wide area network (WAN) metrics.

32. The method of claim 24, wherein the RRC command comprises an identifier of the first AP.

33. The method of claim 24, wherein the RRC command further comprises Internet protocol (IP) flows, bearer, or access point name (APN) traffic to offload from the cellular network to the first AP.

34. The method of claim 26, wherein the additional information about the first AP is not required if the first AP is collocated with the base station.

35. The method of claim 26, wherein the additional information is obtained over a backhaul link between the first AP and the base station.

36. The method of claim 26, wherein the additional information about the first AP is obtained from a server.

37. The method of claim 27, wherein upon receiving the report for the first AP, further comprising:
   transmitting a radio resource control (RRC) command to disassociate with the first AP.

38. The method of claim 33, wherein the IP flows or the APN traffic to offload are designated as one or more of seamless or non seamless connectivity.

39. The method of claim 37, wherein disassociating with the first AP comprises offloading data transmissions from the first AP to a cellular network.

40. The method of claim 38, wherein the seamless connectivity comprises Internet protocol flow mobility (IFOM) or multi-access packet data network connectivity (MAPCON).

41. An apparatus for wireless communications by a user equipment (UE), comprising:
   means for receiving, from a serving base station of a Radio Access Network (RAN), a request to measure one or more wireless local area network (WLAN) access points (APs), wherein the request to measure comprises a measurement configuration that indicates to the UE a transmission time of a WLAN beacon relative to timing of the RAN;
   means for determining one or more metrics for at least one of the one or more WLAN APs based on the request;
   means for comparing the metrics for the at least one of the one or more WLAN APs to a threshold;
   means for reporting a first AP of the one or more WLAN APs based on the comparison;
   means for receiving, based on the reporting, a command to offload data transmissions from a cellular network to the first AP, wherein which data transmissions are offloaded from the cellular network to the first AP is based on a first policy from a core network (CN); and
   means for determining, after receiving the command and based on a second policy from the CN, a type of traffic for which to access the serving base station before associating or exchanging transmissions with the first AP.

42. The apparatus of claim 41, wherein the report comprises one or more of the metrics and an identifier of the first AP.

43. The apparatus of claim 41, wherein the means for reporting further comprises:
   means for reporting the UE is already connected to the first AP.

44. The apparatus of claim 41, further comprising:
   means for receiving a radio resource control (RRC) command to offload the data transmissions from the cellular network to the first AP upon reporting the first AP.

45. The apparatus of claim 41, further comprising:
   means for receiving a configuration request to report additional information about the first AP upon reporting the first AP.

46. The apparatus of claim 41, wherein the means for reporting is configured to:
   report the first AP of the one or more WLAN APs if the metrics for the first AP are below the threshold.

47. The apparatus of claim 41, wherein means for determining the one or more metrics for the one or more WLAN APs comprises means for receiving information elements (IEs) in a beacon or a probe response from the WLAN APs.

48. The apparatus of claim 41, wherein the one or more WLAN APs correspond to a specific WLAN channel or a WLAN band.

49. The apparatus of claim 41, wherein the one or more WLAN APs are identified by a Network Access Identifier Home Realm (NAIHR), a service set identifier (SSID), a basic SSID (BSSID), a homogeneous extended SSID (HESSID), or $3^{rd}$ Generation Partnership Project (3GPP) cellular network information.

50. The apparatus of claim 41, wherein the means for reporting is configured to:
   report the first AP if the metrics for the first AP exceed the threshold.

51. The apparatus of claim 41, further comprising:
   means for determining if the serving base station supports WLAN and radio access network (RAN) interworking; and
   means for determining whether to access the serving base station before associating or exchanging transmissions with a WLAN AP based on the result of determining if the serving base station supports WLAN and radio access network (RAN) interworking.

52. The apparatus of claim 42, wherein the one or more metrics comprise a received signal strength indicator (RSSI), a received channel power indicator (RCPI), a received signal to noise indicator (RSNI), a basic service set (BSS) load, a channel load, or wide area network (WAN) metrics.

53. The apparatus of claim 43, further comprising means for associating with the first AP upon receiving the RRC command.

54. The apparatus of claim 44, wherein the RRC command comprises an identifier of the first AP.

55. The apparatus of claim 44, wherein the RRC command further comprises Internet protocol (IP) flows, bearer, or access point name (APN) traffic to offload from the cellular network to the first AP.

56. The apparatus of claim 45, wherein the means for reporting the additional information about the first AP comprises means for performing an access network query protocol (ANQP) with the first AP.

57. The apparatus of claim 46, further comprising:
   means for receiving a radio resource control (RRC) command to disassociate with the first AP upon reporting for the first AP.

58. The apparatus of claim 55, wherein the IP flows or the APN traffic to offload are designated as one or more of seamless or non seamless connectivity.

59. The apparatus of claim 57, wherein disassociating with the first AP comprises offloading data transmissions from the first AP to a cellular network.

60. The apparatus of claim 58, wherein the seamless connectivity comprises Internet protocol flow mobility (IFOM) or multi-access packet data network connectivity (MAPCON).

61. An apparatus for wireless communications by a base station of a Radio Access Network (RAN), comprising:
means for transmitting, to a user equipment (UE), a request to measure one or more wireless local area network (WLAN) access points (APs), wherein the request to measure comprises a measurement configuration that indicates to the UE a transmission time of a WLAN beacon relative to timing of the RAN;
means for receiving a report for a first AP of the one or more WLAN APs; and
means for transmitting, based on the report, a command to offload data transmissions from a cellular network to the first AP, wherein which data transmissions are offloaded from the cellular network to the first AP is based on a first policy from a core network (CN),
wherein a second policy from the CN indicates a type of traffic for which the UE, after receiving the command, is to access the base station before associating or exchanging transmissions with the first AP.

62. The apparatus of claim 61, wherein the report comprises one or more of the metrics and an identifier of the first AP.

63. The apparatus of claim 61, wherein the report comprises an indication the UE is already connected to the first AP.

64. The apparatus of claim 61, further comprising:
means for transmitting a radio resource control (RRC) command to offload the data transmissions from the cellular network to the first AP upon receiving the report for the first AP.

65. The apparatus of claim 61, further comprising:
means for transmitting a radio resource control (RRC) command to offload data transmissions from a serving WLAN AP to the first AP upon receiving the report for the first AP.

66. The apparatus of claim 61, further comprising:
means for determining whether additional information about the first AP is required upon receiving the report for the first AP; and
means for transmitting, to the UE, a configuration request to report additional information about the first AP upon determining the additional information is required.

67. The apparatus of claim 61, wherein the means for receiving is configured to:
receive the report of the first AP of the one or more WLAN APs if measurements for the first AP are below the threshold.

68. The apparatus of claim 61, wherein the one or more WLAN APs correspond to a specific WLAN channel or a WLAN band.

69. The apparatus of claim 61, wherein the one or more WLAN APs are identified by a service set identifier (SSID), a basic SSID (BSSID), a homogeneous extended SSID (HESSID), or 3$^{rd}$ Generation Partnership Project (3GPP) cellular network information.

70. The apparatus of claim 61, wherein the means for receiving is configured to:
receive the report of the first AP if measurements for the first AP exceed a threshold.

71. The apparatus of claim 62, wherein the one or more metrics comprise a received signal strength indicator (RSSI), a received channel power indicator (RCPI), a received signal to noise indicator (RSNI), a basic service set (BSS) load, a channel load, or wide area network (WAN) metrics.

72. The apparatus of claim 64, wherein the RRC command comprises an identifier of the first AP.

73. The apparatus of claim 64, wherein the RRC command further comprises Internet protocol (IP) flows, bearer, or access point name (APN) traffic to offload from the cellular network to the first AP.

74. The apparatus of claim 66, wherein the additional information about the first AP is not required if the first AP is collocated with the base station.

75. The apparatus of claim 66, wherein the additional information is obtained over a backhaul link between the first AP and the base station.

76. The apparatus of claim 66, wherein the additional information about the first AP is obtained from a server.

77. The apparatus of claim 67, further comprising:
means for transmitting a radio resource control (RRC) command to disassociate with the first AP upon receiving the report for the first AP.

78. The apparatus of claim 73, wherein the IP flows or the APN traffic to offload are designated as one or more of seamless or non seamless connectivity.

79. The apparatus of claim 77, wherein disassociating with the first AP comprises offloading data transmissions from the first AP to a cellular network.

80. The apparatus of claim 78, wherein the seamless connectivity comprises Internet protocol flow mobility (IFOM) or multi-access packet data network connectivity (MAPCON).

81. An apparatus for wireless communications, comprising:
at least one processor configured to:
receive, from a serving base station of a Radio Access Network (RAN), a request to measure one or more wireless local area network (WLAN) access points (APs), wherein the request to measure comprises a measurement configuration that indicates to the UE a transmission time of a WLAN beacon relative to timing of the RAN,
determine one or more metrics for at least one of the one or more WLAN APs based on the request,
compare the one or more metrics for the at least one of the one or more WLAN APs to a threshold,
report a first AP of the one or more WLAN APs based on the comparison,
receive, based on the report, a command to offload data transmissions from a cellular network to the first AP, wherein which data transmissions are offloaded from the cellular network to the first AP is based on a first policy from a core network (CN), and
determine, after receiving the command and based on a second policy from the CN, a type of traffic for which to access the serving base station before associating or exchanging transmissions with the first AP; and
a memory coupled with the at least one processor.

82. An apparatus of a Radio Access Network (RAN) for wireless communications, comprising:
at least one processor configured to:
transmit, to a user equipment (UE), a request to measure one or more wireless local area network (WLAN)

access points (APs), wherein the request to measure comprises a measurement configuration that indicates to the UE a transmission time of a WLAN beacon relative to timing of the RAN, receive a report for a first AP of the one or more WLAN AP, and transmit, based on the report, a command to offload data transmissions from a cellular network to the first AP, wherein which data transmissions are offloaded from the cellular network to the first AP is based on a first policy from a core network (CN), wherein a second policy from the CN indicates a type of traffic for which the UE, after receiving the command, is to access the base station before associating or exchanging transmissions with the first AP; and a memory coupled with the at least one processor.

83. A non-transitory computer readable medium for wireless communications by a user equipment (UE), the non-transitory computer readable medium having instructions stored thereon for:

receiving, from a serving base station of a Radio Access Network (RAN), a request to measure one or more wireless local area network (WLAN) access points (APs), wherein the request to measure comprises a measurement configuration that indicates to the UE a transmission time of a WLAN beacon relative to timing of the RAN;

determining one or more metrics for at least one of the one or more WLAN APs based on the request;

comparing the one or more metrics for the at least one of the one or more WLAN APs to a threshold;

reporting a first AP of the one or more WLAN APs based on the comparison;

receiving, based on the reporting, a command to offload data transmissions from a cellular network to the first AP, wherein which data transmissions are offloaded from the cellular network to the first AP is based on a first policy from a core network (CN); and determining, after receiving the command and based on a second policy from the CN, a type of traffic for which to access the serving base station before associating or exchanging transmissions with the first AP.

84. A non-transitory computer readable medium for wireless communications by base station of a Radio Access Network (RAN), the non-transitory computer readable medium having instructions stored thereon for:

transmitting, to a user equipment (UE), a request to measure one or more wireless local area network (WLAN) access points (APs), wherein the request to measure comprises a measurement configuration that indicates to the UE a transmission time of a WLAN beacon relative to timing of the RAN;

receiving a report for a first AP of the one or more WLAN APs; and transmitting, based on the report, a command to offload data transmissions from a cellular network to the first AP, wherein which data transmissions are offloaded from the cellular network to the first AP is based on a first policy from a core network (CN), wherein a second policy from the CN indicates a type of traffic for which the UE, after receiving the command, is to access the base station before associating or exchanging transmissions with the first AP.

* * * * *